United States Patent
Parkin et al.

(10) Patent No.: US 10,693,555 B2
(45) Date of Patent: Jun. 23, 2020

(54) OPTICAL NETWORK FAULTED IDENTIFICATION

(71) Applicant: BRITISH TELECOMMUNICATIONS PUBLIC LIMITED COMPANY, London (GB)

(72) Inventors: Neil Parkin, London (GB); Anas Mohsin, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/508,635

(22) PCT Filed: Aug. 25, 2015

(86) PCT No.: PCT/EP2015/069463
§ 371 (c)(1),
(2) Date: Mar. 3, 2017

(87) PCT Pub. No.: WO2016/034457
PCT Pub. Date: Mar. 10, 2016

(65) Prior Publication Data
US 2017/0279523 A1   Sep. 28, 2017

(30) Foreign Application Priority Data
Sep. 3, 2014  (EP) .................................. 14275183

(51) Int. Cl.
*H04B 10/07*    (2013.01)
*H04B 10/071*   (2013.01)
(Continued)

(52) U.S. Cl.
CPC ....... *H04B 10/071* (2013.01); *H04B 10/0773* (2013.01); *H04B 10/25* (2013.01);
(Continued)

(58) Field of Classification Search
CPC .. H04B 10/071; H04B 10/0773; H04B 10/25; H04B 10/07; H04Q 11/0067; H04Q 2011/0083
(Continued)

(56) References Cited

U.S. PATENT DOCUMENTS 4,509,827 A  *  4/1985  Cowen ................. G02B 6/3803
                                                    356/138
5,177,354 A  *  1/1993  Tomita ............... G02B 6/29368
                                                    250/227.15
(Continued)

FOREIGN PATENT DOCUMENTS

EP   1 578 038     9/2005
EP   2034635       3/2009
EP   2670067      12/2013

OTHER PUBLICATIONS

Caviglia et al, Optical Maintenance in PONs, Sep. 1998, ECOC, All Document. (Year: 1998).*
(Continued)

*Primary Examiner* — Dibson J Sanchez
(74) *Attorney, Agent, or Firm* — Nixon & Vanderhye PC

(57) ABSTRACT

An optical network node capable of being powered, comprising—a reflector arranged to reflect an optical signal, and—a switch arranged to direct the optical signal to the reflector in dependence on whether the optical network node is powered.

16 Claims, 3 Drawing Sheets

(51) Int. Cl.
*H04B 10/077* (2013.01)
*H04B 10/25* (2013.01)
*H04Q 11/00* (2006.01)

(52) U.S. Cl.
CPC ......... *H04Q 11/0067* (2013.01); *H04B 10/07* (2013.01); *H04Q 2011/0083* (2013.01)

(58) Field of Classification Search
USPC .................................. 398/9–38, 43–103
See application file for complete search history.

(56) References Cited

U.S. PATENT DOCUMENTS

| | | | | |
|---|---|---|---|---|
| 5,251,001 | A * | 10/1993 | Dave | H04B 10/071 250/227.11 |
| 5,319,482 | A * | 6/1994 | Tsuchiya | H04B 10/071 356/73.1 |
| 5,452,071 | A * | 9/1995 | Takeuchi | G01M 11/3109 356/73.1 |
| 5,491,573 | A * | 2/1996 | Shipley | G01M 11/3136 356/73.1 |
| 5,491,574 | A * | 2/1996 | Shipley | G01M 11/3136 398/21 |
| 5,754,284 | A * | 5/1998 | Leblanc | G01M 11/3109 356/73.1 |
| 6,028,661 | A * | 2/2000 | Minami | G01M 11/3136 356/73.1 |
| 6,031,946 | A * | 2/2000 | Bergmann | G02B 6/266 385/18 |
| 6,396,575 | B1 * | 5/2002 | Holland | G01M 11/3181 356/73.1 |
| 6,512,610 | B1 * | 1/2003 | Minami | G01M 11/3136 356/73.1 |
| 6,534,997 | B1 * | 3/2003 | Horishita | H04B 10/07 324/533 |
| 6,728,446 | B2 * | 4/2004 | Doerr | G02B 6/12016 385/24 |
| 6,744,986 | B1 * | 6/2004 | Vohra | H04J 14/0205 398/49 |
| 7,302,179 | B2 | 11/2007 | Alavie et al. | |
| 7,680,416 | B2 * | 3/2010 | Hann | H04J 14/02 398/66 |
| 7,684,702 | B2 * | 3/2010 | Lu | H04B 10/0773 398/33 |
| 7,848,645 | B2 * | 12/2010 | Healey | H04B 10/071 398/16 |
| 7,956,992 | B2 * | 6/2011 | Watte | G02B 6/3846 356/73.1 |
| 8,380,063 | B2 | 2/2013 | Bouet et al. | |
| 8,588,571 | B1 * | 11/2013 | Lam | H04B 10/272 385/135 |
| 8,687,957 | B2 * | 4/2014 | Perron | H04B 10/0795 398/25 |
| 9,002,198 | B2 * | 4/2015 | Ikushima | H04B 10/2503 398/16 |
| 9,240,855 | B1 * | 1/2016 | Lam | H04B 10/071 |
| 9,419,707 | B2 * | 8/2016 | Daems | H04B 10/071 |
| 2006/0269287 | A1 * | 11/2006 | Bidmead | H04B 10/0775 398/130 |
| 2008/0008417 | A1 * | 1/2008 | Gilbert | H04B 10/272 385/24 |
| 2008/0062408 | A1 * | 3/2008 | Lai | H04B 10/071 356/73.1 |
| 2008/0291431 | A1 * | 11/2008 | Wang | G01M 11/3136 356/73.1 |
| 2008/0304825 | A1 * | 12/2008 | Mahony | H04Q 11/0067 398/38 |
| 2009/0092388 | A1 * | 4/2009 | Yang | H04B 10/071 398/49 |
| 2009/0110397 | A1 * | 4/2009 | Yeh | H04J 3/1694 398/52 |
| 2009/0190921 | A1 * | 7/2009 | Nakajima | G01M 11/3136 398/13 |
| 2009/0232494 | A1 * | 9/2009 | Hehmann | H04B 10/079 398/25 |
| 2009/0263123 | A1 * | 10/2009 | Zhu | H04B 10/071 398/16 |
| 2010/0239253 | A1 * | 9/2010 | Lin | H04J 14/0282 398/63 |
| 2011/0001959 | A1 * | 1/2011 | Hasegawa | G01M 11/3172 356/73.1 |
| 2011/0255860 | A1 * | 10/2011 | Lee | G01M 11/3136 398/12 |
| 2011/0293265 | A1 * | 12/2011 | Grobe | H04J 14/0282 398/16 |
| 2012/0263458 | A1 * | 10/2012 | Wen | H04B 10/071 398/28 |
| 2013/0272694 | A1 * | 10/2013 | Sandstrom | H04B 10/071 398/21 |
| 2014/0003804 | A1 * | 1/2014 | Fargano | H04B 10/071 398/13 |
| 2014/0029945 | A1 * | 1/2014 | Martinelli | H01S 5/146 398/58 |
| 2014/0056582 | A1 * | 2/2014 | Roberts | H04B 10/07955 398/20 |
| 2014/0064733 | A1 * | 3/2014 | Liu | H04B 10/506 398/79 |
| 2014/0133847 | A1 * | 5/2014 | Vall-Llosera | G01M 11/3127 398/21 |
| 2014/0205293 | A1 * | 7/2014 | Lin | H01S 5/141 398/58 |
| 2014/0314412 | A1 * | 10/2014 | Soto | H04B 10/806 398/67 |
| 2015/0125159 | A1 * | 5/2015 | Kim | H04B 10/501 398/183 |
| 2015/0270895 | A1 * | 9/2015 | Fink | H04B 10/071 398/16 |
| 2015/0311669 | A1 * | 10/2015 | Chuang | H01S 5/0064 398/65 |
| 2015/0381279 | A1 * | 12/2015 | Tanemura | H04J 14/02 398/65 |
| 2016/0097901 | A1 * | 4/2016 | Lu | H04J 14/0282 385/18 |
| 2016/0098913 | A1 * | 4/2016 | Vastmans | G01D 5/264 340/600 |
| 2017/0230108 | A1 * | 8/2017 | Wen | H04B 10/071 |
| 2017/0279635 | A1 * | 9/2017 | Kerpez | H04L 41/32 |

OTHER PUBLICATIONS

International Search Report for PCT/EP2015/069463 dated Oct. 12, 2015, 4 pages.
Yuksel, et al. "Optical Layer Monitoring in Passive Optical Networks" (PONs), ICTON, 10th Anniversary International Conference on IEEE, Jun. 2008, pp. 92-98.
Sebastian Gaede, et al., "Overview of Optical Monitoring in Next Generation Optical Access Networks", Proceedings of Photonische Netze, Leipzig, Paper 15, May 2, 2011 (7 pages).

\* cited by examiner

OPTICAL NETWORK FAULTED IDENTIFICATION

This application is the U.S. national phase of International Application No. PCT/EP2015/069463 filed Aug. 25, 2015 which designated the U.S. and claims priority to EP Patent Application No. 14275183.3 filed Sep. 3, 2014, the entire contents of each of which are hereby incorporated by reference.

BACKGROUND AND SUMMARY

This invention relates to methods, apparatus and systems related to the fault diagnosis, testing and management of optical networks, particularly in the distribution or access network. It has particular application in helping to identify the cause of the loss of connection to a powered remote node located at or near the customer end in the access network.

With global demands for ever-greater data transmission capacities and speeds, optical fibre has been increasingly deployed in preference to copper pairs to points nearer customers in the access network. One development is the "FTTx" point-to-multipoint network architecture, versions of which include Fibre to the Cabinet (FTTC) and Fibre to the Distribution Point (FTTdp) in which optical fibre is typically used between the local exchange and the named point in the access network. FTTx networks enable significantly higher numbers of end user customers to be served by partly or wholly by optical fibre, and comprise increased amount of plant deployed in the access network. Optical fibres and optical fibre equipment give rise to different operational, and test and diagnosis (T&D) issues from traditional copper cables, in which maintaining their physical condition is especially critical to obtaining acceptable performance levels. An example of an FTTx-based implementation is a Passive Optical Network (PON) wherein an Optical Line Terminal (OLT) or Network Termination Equipment (NTE) located in a local exchange at the head end communicates with nodes at the remote end in the access network, the nodes taking the form of Distribution Points (DPs or Distribution Point Units (DPUs)), Optical Network Terminals (ONTs), Optical Network Units (ONUs) and the like.

Active Remote Nodes (RNs) in the access network can be arranged to receive their power from the exchange end or a local power supply. Alternatively, power can be sent to the RN from the customer end e.g. using the Reverse Power Fed (RPF) method, especially those RNs such as DPs which are located very close, relatively speaking, to customer premises. For present purposes, an "RN" can be any node which is remote from the head end which is used to connect to customers, and typically has the function of adapting, amplifying or converting a signal to enable communication networks to be set up between the end user and the head end. An RN can draw power from one or more customer premises or source types (e.g. from a co-located power supply as well as from customer buildings). The numbers of RNs powered in this manner are anticipated to increase following recent developments such as G.Fast-based technology and network configurations in which the fibre is pushed further into the access network beyond the well-known FTTC street cabinet. G.Fast is a Digital Subscriber Line (DSL) ITU standard which promises greater data capacities and deliver improved transmission speeds.

When communications or connections between the RN and the exchange at the head end are lost, the network operator is typically obliged to take action to reinstate the connection e.g., under the terms of an agreed SLA, by removal of the cause of the problem. Such losses of connection can arise from a variety of causes. For present purposes, the causes can be considered according to whether they are (i) structural, or (ii) non-structural in nature. Structural causes include severance of the cable, loose connectors, broken splices or defects in the physical integrity of the optical cable or link (8) along the length between the RN and the head end which prevents or adversely affects the propagation of the light down the line. Structural cable conditions of this kind can be detected and located using an Optical Time Domain Reflectometer (OTDR), as described in e.g. EP2034635 and EP2670067, using methods which will be discussed further below. The effect on the signal or connection could range from the relatively mild (e.g. in the event of a macrobend in the fibre, or a loose connector so that some light can still be propagated down the line), to the fatal (e.g. when the cable is completely cut through by an excavator). At the head end, the affected link to the RN goes "dark" as the connection is lost. In such events, the network operator is usually obliged to take action to avoid or reduce the resulting downtime suffered by the customer(s).

Non-structural causes of connection loss with the RN include optical transceiver failure, component failure, or environmental factors e.g. excessively high temperature, or power outages. In the last case, all connection is lost when the RN loses power, so that optical signals cannot be received at the RN and the optical link to the head end at the local exchange goes dark. The RN could lose power for a number of reasons: it could be the result of equipment failure which would need action from the network operator. On the other hand, the outage could be due to a power failure, a different issue requiring a different course of action. The RN might have been deliberately powered down by the network operator e.g. for planned firmware or software upgrades. Yet another possibility is that the RN is turned off intentionally by customers, who control the power supply of a reverse powered RN. For example, the RN might be turned off overnight to conserve energy, or when the customer goes on holiday. It can therefore be understood that not all powered-down RNs need investigation or other action from the network operator as the loss of signal at the head end does not derive from operational problems in the network for which the network operator is responsible. This may be contrasted with structural causes of connection loss, which will almost always require network operator action and intervention.

It is known that different types of causes for loss of service or connection to customers can be remotely identified while the RN is up and active. For example, optical transceiver faults are indicated by alarms linked to the transmitter bias current; environmental alarms indicate excessively high operating temperatures; Ethernet layer alarms and alarms/diagnostics are associated with the copper line side DSL equipment. There are situations when the cause of loss of connection cannot be diagnosed by transmission of the above messages, such as when the link is physically broken, or unplugged from the RN, or when RN powers down. In a loss of power situation, the RN will not be able to generate such messages, and indeed it would not be likely to be able to receive interrogations from the head end in the first place. Without information about the cause of the loss of connection which would determine the kind of reparative action that should be taken (if any), it is uncertain if an engineer should be sent out to investigate. Depending on e.g. the QoS policy adopted by the network operator, an engineer may be sent out regardless; or else it may be decided to take no action until customer feedback (in the form of complaints) start arriving. Either option is at best a guess and unsatisfactory in the absence of intelligence about the cause of the power loss. Accordingly, there is a need to find out the cause of the connection loss, to make a cost-efficient decision about how to respond, preferably from the head end of the link.

A known technique for the remote monitoring of the power status of a RN from the exchange end include the generation of a "dying gasp" message (referenced in ITU-T Recommendation G.991.2 (December 2003) section 7.1.2.5.3) from the affected device at the customer end (such as the RN). The signal is typically sent to the digital subscriber line access multiplexer (DSLAM) when a power outage occurs. It can serve as an alert to e.g. the Network Management System (NMS) of a shortly-impending power source interruption if the RN is arranged so that a capacitor at the RN holds just enough power to send a last signal over the fibre link to the exchange before all power is lost. Alternatively, the RN can be provided to draw power for a brief period from another source so that the message can be sent. The transmission of the dying gasp message ends the session, and it is typically used to collect real-time and historical near and far-end link performance statistics. A dying gasp signal is however not always reliable as an indication of the cause of the loss of connection between the RN and the head end. This is because it may not be sent, may be corrupted, or may fail to be processed at the recovering end. The problem is compounded due to the impossibility of its retransmission after power is lost, and due to the ending of the session after it is sent. It is also noted that at present, the dying gasp signal is specified as being only optional in the GPON standard, while there is no specification for optical point to point networks at all. Furthermore, this approach does not allow for constant monitoring of the link, which rules out the possibility of a quick reaction to real time alerts of a potential fault condition.

While previous FTTx customers comprised enterprise and businesses in relatively small numbers, increasingly larger proportions of customers are residential entities. Not only are there are now considerably more access network nodes of all varieties which need cost-efficient management and maintenance, but residential customers will be significantly more price-sensitive than commercial entities. Provisioning current and future FTTx customers requires solutions which can cope with the volume of activity involved in the operation, testing and diagnosis of such networks in a cost-efficient manner. In particular, residential customers cannot and should not be ignored in an RN connection loss event just because they are paying lower rates for their service. With the numbers of remotely-powered RNs expected to grow at a rapid pace however, it would be highly inefficient if each case of a RN which has lost its connection had to be investigated without foreknowledge of the possible cause of the outage.

It would be desirable to remotely (preferably at the head end) determine if the cause of an unplanned loss of connection to a RN is an operational fault needing network operator action. Specifically, it would be desirable to have a reliable solution which goes toward discovering the cause of the connection loss without having to despatch an engineer to the location of the RN in the situation when the RN is unable to send and/or receive signals and which can no longer be managed. It has been realised with the current and imminent deployment of increased numbers of reverse powered RNs in particular, the chances have increased that a disconnection caused by loss of power does not require investigation as the powering down stems from customer choice. The technical implementation of such a solution in an optical network would help address the abovementioned problem.

According to the invention there is provided an optical network node capable of being powered, comprising
 a transceiver,
 a reflector arranged to reflect an optical signal, and
 a switch arranged to direct the optical signal to the transceiver or the reflector in dependence on whether the optical network node is powered.

An optical signal transmitted to an optical network node as configured according to the invention over an optical link, can be received by the node as along as the structure of the link to the node does not include physical discontinuities. The RN need not be powered on to receive the optical signal. A switch directs the signal received at the RN to a reflector in dependence on the power status of the RN. In one implementation, the switch directs the received optical signal to the reflector only when the RN is powered down. The reflector is arranged to generate a reflection of the optical signal: in contrast with the error messages and alarms of the prior art, the RN need not be powered up to generate and to send the reflected optical signal, which can serve as an alarm or such message back to the head end via the optical link to such other location as required. Embodiments of the invention can therefore very reliably indicate or confirm that the cause of a loss of connection event is down to the RN being powered down.

In preferred embodiments, the switch comprises a microelectromechanical systems switch, while a variety of implementation options are available for the reflector such as a Fibre Bragg Grating (FBG) reflector; a thin film filter; an optical fibre having a cleaved end with a predetermined reflective value; an optical fibre having a cleaved end with a predetermined reflective pattern; and an optical fibre having a cleaved end of a predetermined length having a cleaved end. The skilled person would appreciate that it is possible to use more than one of the reflector designs in conjunction with each other.

Preferred applications of the invention can be used to detect causes of loss of connection other than a powered down RN. For example, an arrangement in which the connection socket (into which the optical connector of the optical fibre cable or link is received) includes a reflecting element, can help to detect or confirm that the loss of connection is due to the cable being unplugged from the RN.

According to another aspect of the invention there is provided a telecommunications network including an optical network node according to the invention operationally linked by an optical fibre to an optical transmitter, the switch being arranged to direct an optical signal output by the optical transmitter to the reflector in dependence on whether the optical network node is powered.

Preferably the optical signal output by an optical transmitter in the form of an OTDR, which can output pulsed or continuous signals to the RN. The optical transmitter is preferably located at the head end of the link between the RN and the OLT and/or network management components. Reflected signals output by the RN are preferably reflected back to the optical transmitter located at the head end, enabling a network operator to remotely monitor the link for specific causes of any connection loss events. As noted, the reflections can be directed as needed to any other location e.g. if the network operator's T&D activities are carried out at a central location and not necessarily at the local exchange where the relevant OLT is sited. Ideally, the monitoring activity is carried out continuously to enable real time or near-real time responses when problems arise.

In an optical network based on G.Fast technology, a network management system preferably includes a persistent management agent which can act as the RN's agent to receive messages and alarms concerning a loss of connection between the optical network node and the optical line terminal, when the RN itself is unable to do so. This relieves the network management system of the need to keep sending alarms to an unresponsive node which may not be fatally "dead". It also allows for management instructions relating to reconfigurations and the like, to be held and delivered later to the RN if and when it re-activates.

Related to the abovementioned optical connector for plugging into the RN, the connector itself may be provided with its own reflector, which can generate a reflection advantageously giving an unambiguous indication that the fibre link to the RN is intact.

According to another aspect of the invention there is provided a method of remotely detecting the power status of an optical network node, comprising:

using a transceiver to send or receive an optical signal at the optical network node, and in dependence on whether the optical network node is powered, using a switch to direct the optical signal to the transceiver or to a reflector arranged to reflect the optical signal.

In a preferred application of the method, the optical signal serving as a test signal is transmitted and received at a wavelength which can be used at the same time during normal data transmissions, and sent continuously. In the method, the test optical signals are preferably compared against a base or reference value which represents the expected length or distance of the link between the two ends.

BRIEF DESCRIPTION OF THE DRAWINGS

The invention will now be described, by way of example only, with reference to the following drawings in which.

DETAILED DESCRIPTION OF PRESENT EXAMPLE EMBODIMENTS

Figure 1:
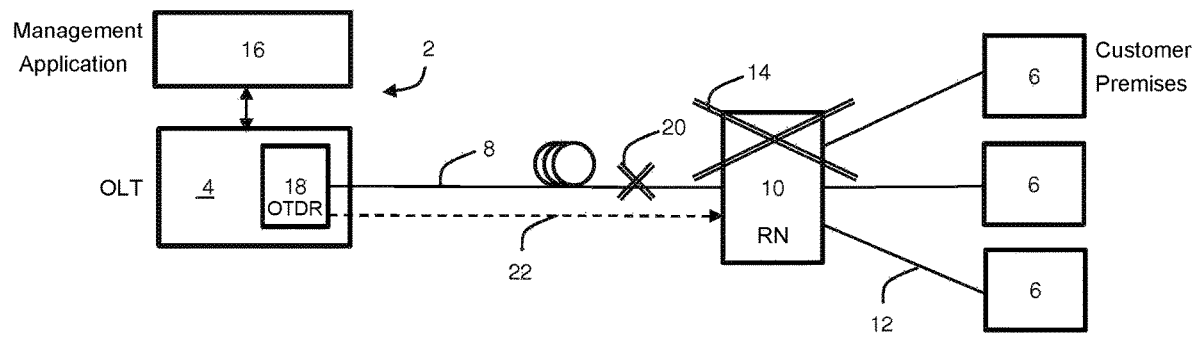
FIG. 1 depicts the primary components of an access network.

A drawing of the main components included in a conventional point to multipoint link within a network is shown in FIG. 1. An Optical Line Terminal (OLT) (4) is located at the head end (2) of the access network where the local exchange or central office is sited. The OLT is operatively connected to a higher layer network management software application (16) comprising an Element Management System (EMS) and/or a Network Management System (NMS). The OLT provides service to one or more customer premises (6) at the customer end via a Remote Node (RN) (10). In an exemplary G.Fast implementation based on FTTdp, the RN is a DP to which the local exchange is linked by optical fibre (8), while the connection between the DP and the customers' premises comprises twisted copper pairs (12) which enables the transmission of power to the RN using e.g. the RPF method mentioned above. When powered up and active, the RN manages its physical infrastructure (i.e. the fibre link) by means of bi-directional transmissions of control/data messages with the head end. If the RN (10) loses power (14) for any reason, the optical link (8) goes dark and the RN can no longer be managed from the head end. It is only during normal operations when the RN is powered and live that an alarm (e.g. a dying gasp signal) can be raised by the exchange of signals along the optical link (8).

An implementation of the invention proposes a determination of whether an RN fibre link is structurally intact during the period of connection loss, by using e.g. an OTDR (18). As is known, OTDRs enable discovery of physical discontinuities (i.e. breaks in the fibre, faulty connections and splices, excessive fibre bends and other structural deformities) (20) in the optical link. OTDRs typically operate by sending an optical pulse or signal (22) which is backscattered and reflected back by the presence of discontinuities in the fibre structure, faulty connector or the like. By measuring the time that the pulse takes to return to source and its magnitude, a suitably configured OTDR can be used to help determine the location, nature and extent of the physical discontinuity. For example, a large reflection in the −14 dB region indicates a full break, while a smaller reflection indicates that the structure of the fibre link has suffered something less than a complete break.

As shown in FIG. 1, the OTDR (18) is operatively connected to the OLT (4), and can form part of the OLT (4) (e.g. embedded in the OLT transceiver or the line card). It can take a very simple form (e.g. only to output the test optical pulses), the task of processing of the reflected pulses being carried out elsewhere (e.g. in the network management application). Such a configuration removes the need for filters or switches and has the advantage of reduced cost and complexity. Alternatively, the OTDR functionality can be provided by standard standalone OTDR (28 in FIG. 4) which may be connected into the link under test via either a filter or an optical switch. This allows for the OTDR to be retrofitted to an already-installed OLT. An OTDR can be configured to operate at any wavelength. It is expected via standardisation that 1625 nm will be reserved for OTDR measurements, allowing for OTDR measurements to be taken whilst live data communications are underway. In embodiments and implementations of the invention, the OTDR (18) is sited at the head end (2), so that the network operator can receive the OTDR test results remotely from the test site. It is however within the scope of the invention to provide the OTDR functionality at the other locations within the access network e.g. at the customer end or at the RN, if the OTDR results can be received by the party requiring this information for example via a separate communications channel.

In an implementation of the invention, the OTDR is configured to monitor the link by transmitting an optical pulse (22) from the head end to the monitored RN, and the obtained reading of the time indicating the length of the fibre link between the OLT (4) at the head end and the RN (10) is then compared against a baseline or reference value. This reference value is based on the expected, "unbroken", length of the fibre cable (which may comprise a single length of a fibre or a number of lengths spliced or otherwise connected together), and can be a known value from a central record. Alternatively, this reference value can be obtained from e.g. an initial "live" measurement of the link on power up of the system: in certain applications this is preferred over using a recorded length value as it provides a more accurate reading of the actual link being measured. In the comparison, any deviation from the baseline value would be taken as an indication of a fault on the link which would need action by the network operator. In a preferred application, the OTDR can be used in conjunction with a RN power down indicator providing a dying gasp message to the head end. The network provider can choose to operate the OTDR in different ways according to e.g. an adopted T&D policy, for instance by conducting the test only when connection is lost, or at specified time intervals. Preferably however the OTDR is configured to continuously monitor the link for physical discontinuities e.g. by superimposition of the measurement signal on the data stream or else using a wavelength that does not interfere with the data channel wavelength, so as to detect if the operative length of the optical link remains unchanged from the reference value.

Figure 2A:
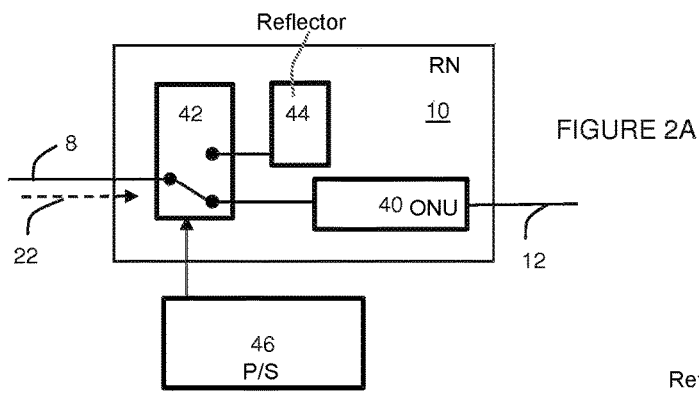
FIGS. 2A and 2B depict the operation of a remote node.
Figure 2B:
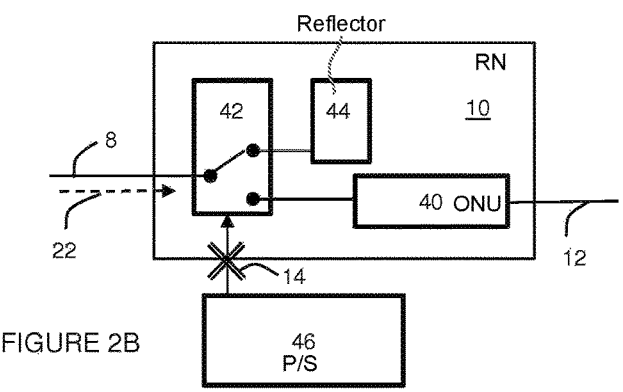

FIGS. 2A and 2B depict the operation of an exemplary configuration of an RN (10) configured according to the invention, in which the RN is connected to the head end via an optical link (8) (over which data as well as test signals (22) from the OTDR at the head end can be transmitted), and to the customer premises via copper (12). The RN draws power from a power supply (46), which may be provided in various ways as noted above, including by RPF. As is conventional, the RN includes a transceiver or an optical network unit (ONU) (40) which communicates with the head end and, where relevant, the customer premises. In contrast with conventional RNs, a detecting unit (44) including a reflector is included in the RN which is operationally connected to the optical fibre (8) via a switch (42). Preferably the switch takes the form of a non-latching electric switch such as a micro-electromechanical systems (MEMS) switch. The switch is set up to direct signals between the transceiver (40) and the reflector (44) in dependence on the power state of the RN.

FIG. 2A depicts the RN in the powered-up state. Here, optical signals including a test pulse from an optical transmitter like an OTDR reach the switch (42), which is configured to direct the signals to the transceiver unit (40). In this "normal" operational state, data signals are processed in the usual way. FIG. 2B depicts the RN when it has lost power (14) (e.g. when a customer switches off the power supply to a RPF RN), the switch directs all arriving signals to the reflector (44). In one embodiment, the switch is powered by the same power source as for the RN as whole, e.g. when it takes the form of a 1×2 MEMS switch of the type mentioned above, which reverts or defaults to the position shown in FIG. 2B when power is lost. When a test pulse reaches the reflector, it is reflected back to the OTDR at the head end or such other place where it is located. The reflector can take a variety of forms, including a FBG or a thin film filter. The OTDR will be able to identify that the pulse has reached the reflector by comparing the received reflection with the reference or baseline time or distance value, allowing confirmation that an optical reflection has not arrived from a physical discontinuity along the fibre length. In a preferred application, the results obtained from receipt of the reflection is made even more certain by generating a specific "signature" reflection which is obtained by configuring the reflector accordingly. In this connection, alternative embodiments of the reflector can take the form of an optical fibre having a cleaved end which is cleaved to a known value or to produce a reflection having a signature pattern. Yet another embodiment of the reflector comprises an additional length of optical fibre having a cleaved end used in conjunction with an OTDR which knows the additional length of the detection fibre. The above detection methods can be used with each other for greater certainty that the correct reflection has been received.

The skilled person would appreciate that other configuration alternatives are possible within the scope of the invention. For example, the RN could be configured to operate so that test pulses reach the reflector when the RN is powered on, by sending the received optical signals to both the reflector and transceiver during normal operation (in which case the switch takes the form of a power splitter); when the RN is powered off the test pulses are no longer received by the reflector. In certain applications, the switch can have a waveblocking function. An optical transmitter outputting the test pulses may be placed at a location other than the head end, although the OTDR or such measurement unit is more ideally placed at the head end allowing for remote detection at e.g. the local exchange.

In use therefore, a very reliable indication can be obtained that the RN has powered down, which goes a long way in deciding that the loss of connection is not caused by factors which require action by the network operator (especially in the G.Fast context where RFP DPs are used as RNs). Usefully, an optical test signal does not have to be powered to be propagated through the fibre link to be received at or reflected from, the RN. This may be contrasted with e.g. the generation of a dying gasp signal, as apparatus and methods of the invention can provide a firm indication of the power status of the RN even when the RN itself is "dead" and unable to communicate. Advantageously, the OTDR in embodiments of the invention serves two functions: its more conventional role of detecting physical discontinuities in the optical link, as well as to discover with certainty that a RN has lost power.

Figure 3:
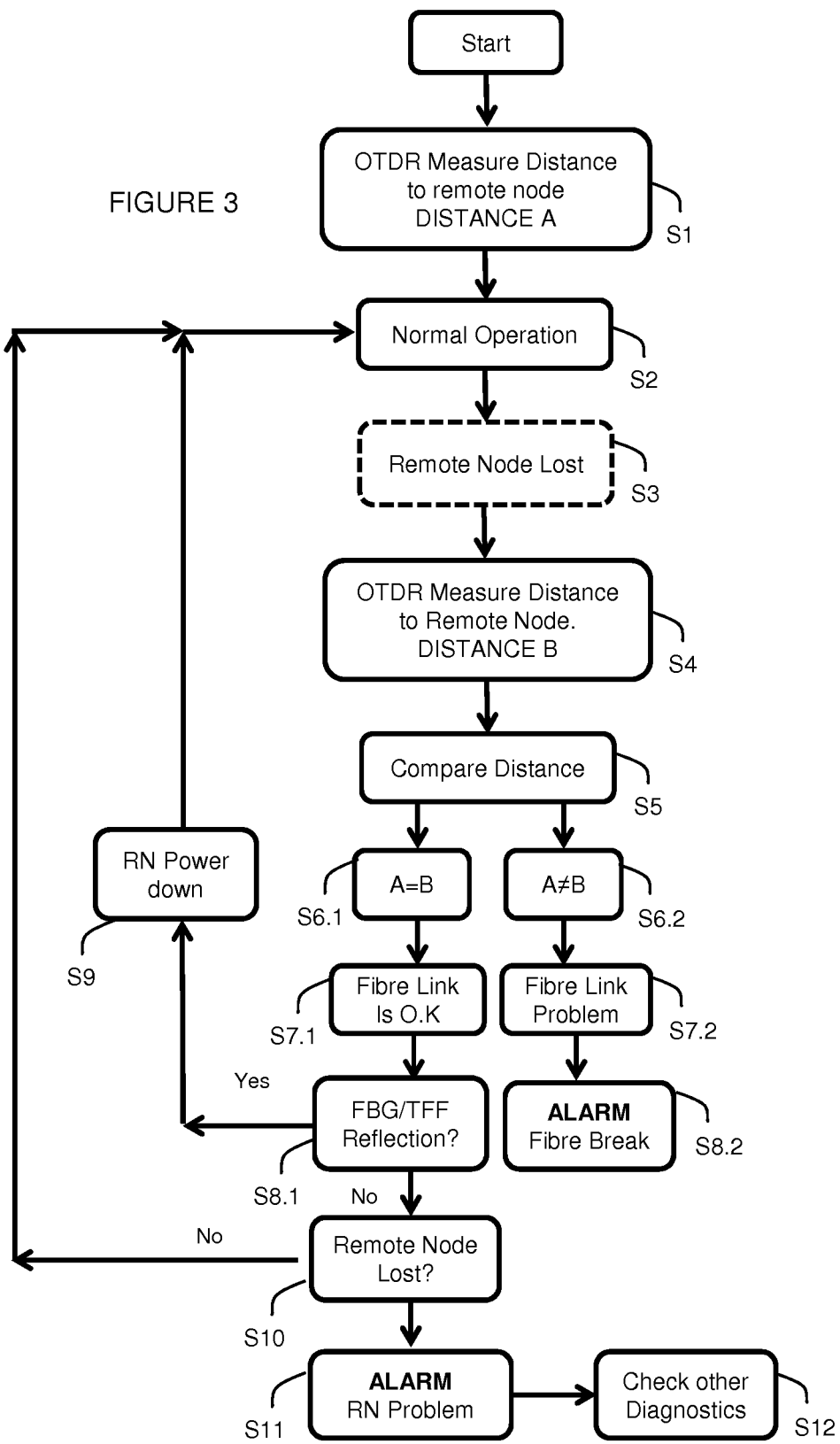
FIG. 3 is a flow chart describing steps in an application of the invention.

The flow chart of FIG. 3 summarises the steps of an exemplary operation of the network described above. The process starts by measurement (step S1) of the distance of the optical link connecting the head end to the RN, which yields a reference value DISTANCE A. As previously noted, this is used for comparison purposes. The OTDR can be arranged to send test optical pulses in different ways, e.g. at specified periods, continuously, or only in response to an event e.g. reception of a dying gasp signal. Where the adopted policy is to periodically or continuously test the line, test pulses are sent towards the RN even during under normal operating conditions (step S2) at e.g. a frequency which does not disrupt ongoing data communications over the tested link. If and when an RN loss of connection event occurs and is detected (step S3) e.g. by the NMS, the link distance is measured to obtain a link DISTANCE B (step S4), and compared (step S5) against the reference value DISTANCE A. If the compared distance values are the same (step S6.1), it can be concluded that the loss of connection is due to (probably non-structural) causes undetectable by the OTDR and that the structure of the fibre is "OK" (step 7.1). If on the other hand, the DISTANCE A and DISTANCE B values returned by the OTDR are different (step S6.2), then it could be concluded that the fault is caused by a break or other structural problem (20) with the link (step S7.2). An alarm can be optionally generated (step S8.2) and/or an engineer can be despatched.

The above steps will help identify if a physical discontinuity is the cause of a loss of connection event: if it is, repair action can be immediately taken; if it is not, then physical discontinuities as a class can be eliminated as a cause. The above steps can form part of a larger T&D process to home in on the exact cause of the connection loss, which may include some or all of the following. For example, greater certainty about the cause of the connection loss can be achieved by simultaneously monitoring the line for a dying gasp signal indicating loss of power to the RN. As previously observed, this approach is not entirely reliable for reasons set out above and because the one-off dying gasp signal cannot be subsequently verified. A more definitive result can be obtained by optionally configuring the RN in the manner described above in connection with FIGS. 2A and 2B. Specifically, the system is monitored (step S8.1), preferably continuously, for a reflection signal from the RN which indicates that power has been lost (step S9) in the manner discussed above. If and when the RN is powered back up (e.g. when a customer switches the power supply to a RPF RN back on), this can again be detected by the OTDR, at which point normal operation (step S2) resumes. If it is established that the RN is still powered on but the loss of connection status persists (step S10) then the T&D process can progress to the next step in which an alarm is raised (step S11), leading to further investigation about other causes (step S12) of the problem.

By way of example, when a loss of signal event occurs, a test optical pulse output by the OTDR can yield the following results:

Scenario 1
DISTANCE A≠DISTANCE B
Unable to sense RN reflector
Status: There is a break in the optical link, which needs to be repaired Scenario 2
DISTANCE A=DISTANCE B
Unable to sense RN reflector
Status: The link is sound and the RN is still powered up. The loss of connection is due to other causes and will need to be checked further.

Scenario 3
DISTANCE A=DISTANCE B
Able to sense RN reflector
Status: The link is sound but the RN is powered down. There is a chance that this may be due to causes which need network operator involvement (e.g. the RN has been damaged) but there is also a chance that it has been switched off by customer choice, which will not need action.

Use of embodiments of the invention therefore enable a fuller idea to be had about the potential cause of a loss of connection between an OLT and an RN.

Figure 4:
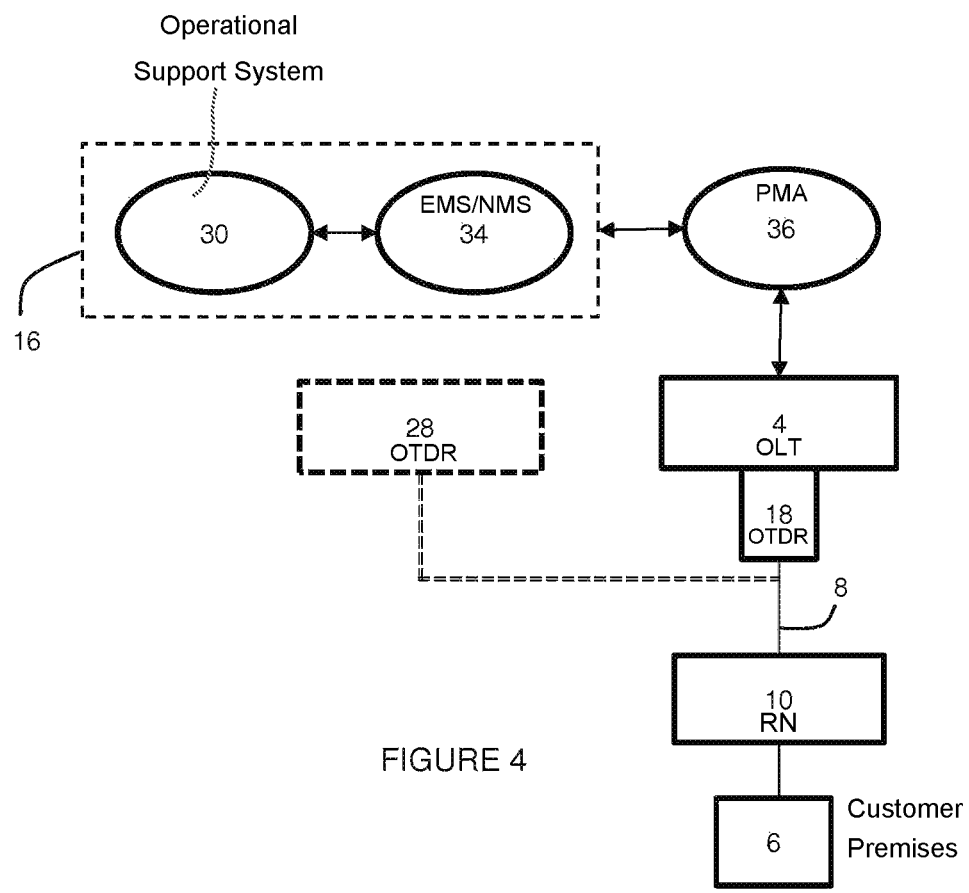
FIG. 4 depicts the management components of an exemplary access network.

As previously mentioned, a loss of connection event results in the generation of alarms which are sent to the management layer of the network. These typically continue to be sent to the EMS and/or NMS for the most or all of the time that connection is down. Should the cause of the connection loss not be one for concern (e.g. where the RN is intentionally switched off by customers), NMS and/or EMS resources are needlessly consumed. FIG. 4 provides details of the higher level management software components (16) shown in brief in FIG. 1. The management components can comprise an Operational Support System (30) and/or the EMS/NMS (34), which in a G.Fast-based embodiment are operatively linked to the OLT (4) via a Persistent Management Agent (PMA) (36). A PMA is a relatively recent development which functions to handle communications between network elements (e.g. the RN (10)) and the network management components (16), as well as to store information related to changes in configuration, power status. It is currently being specified in BBF WT-301 (E2E Architecture) and WT-318 (Fibre to the DP Management), being a software application proposed for deployment particularly but not exclusively in FTTdp networks. A PMA is typically hosted with the OLT or is embedded in the OLT, but is in any event located in an always powered-on environment, typically at the local exchange or head end, or other central site which has electrical power backup. A PMA can be provided at the head end for each one or for a group of RNs, and the signals feeding between the multiple PMAs and the NMS are aggregated for efficiency in processing. In a preferred arrangement of the invention, a PMA (36) is operatively connected to the OTDR (18, 28) as well as to the EMS/NMS (34) in the management application (16).

In respect of the link between with the OTDR, this enables the more complex functions such as processing received reflected test pulses (enabling the OTDR to be a relatively simple optical transmitter). Furthermore, the link can be constantly monitored, and the received test data can be correlated with other alarm types as part of a larger T&D process, to carry out a computation or decision on the nature of the fault before communicating with higher layers (such as the OSS or EMS). This reduces the numbers of alarms transmitted within the system, and can also help identify the location in the field to send an engineer to.

If it has been determined that the structural integrity of the optical link to the RN remains intact, the PMA can also be configured to serve as an agent of the inoperative RN for the purpose of receiving and/or storing messages from and to the higher level management system, which would normally be received by an operative RN. Such messages include management or control commands and alarms to and from the NTE or OLT. Examples of management commands include those relating to configuration changes, power status, firmware updates and so on. Examples of alarms include those indicating receiver loss of signal, loss of communications, receiver optical power loss, and OAM alarms, link down alarms, DP alarms, and dying gasp signals. These messages can be forwarded to the RN when it next powers up (e.g. when a customer switches on the power supply). This relieves the management software from being flooded with such messages. Furthermore, there is no need to constantly re-attempt the transmission of the messages to the inoperative RN, or to hold them in abeyance. In an application enabled by the invention, a PMA can accept instructions on behalf of a temporarily inoperative RN (in a "Scenario 3" situation described above) to provision a new service even when the RN is powered down. With the knowledge that the fibre link to the RN is structurally intact, it can be expected with a measure of confidence that the new service will successfully come online once the RN re-powers up. This level of certainty cannot be obtained when relying on e.g. the dying gasp alarm.

Figure 5:
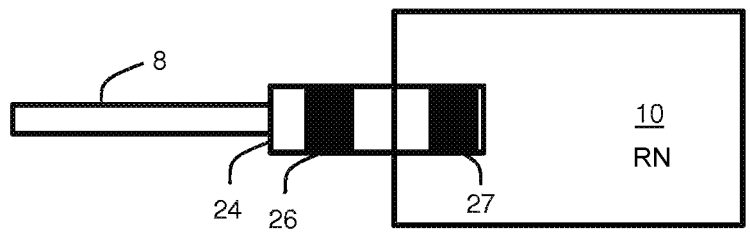
FIG. 5 depicts a fibre connector plugged into a remote node.

Turning now to FIG. 5, this depicts a connector plug (24) plugged into the RN. In a preferred arrangement, the connector is provided with a reflector (26), the use of which helps diagnose the cause of the loss of connection with the RN and contributes to the accuracy of the discovery process of the cause of a loss of connection. In use, an optical pulse from the OTDR reaching the connector will be reflected back by the reflector (26), indicating that the link is sound up to that point or that if there is a break, that the fault lies very near to the RN. A second reflector (27) is provided in the socket region of the RN, so that in use when the connector is plugged into the RN, this reflector allows for a test pulse to be reflected back to the head end to indicate that the link is both unbroken and plugged into the RN. An absence of a reflection from the second reflector (27) on the other hand in conjunction with a reflection from the connector reflector (26) indicates that the optical fibre is sound but not plugged in.

Scenario 4

DISTANCE A=DISTANCE B as indicated by a reflection from reflector (26)

Unable to sense RN socket reflector (27)

Status: The link is sound but unplugged.

Scenario 5

DISTANCE A=DISTANCE B as indicated by a reflection from reflector (26)

Able to sense RN socket reflector (27)

Status: The link is sound and plugged in. The loss of connection is due to other causes, perhaps loss of power which can be verified using RN reflector (44).

As with the reflector (44) located in the RN discussed above in connection with FIG. 2, the reflectors (26, 27) of the optical connector are preferably configured to generate a reflection (e.g. having a specific wavelength response or reflection magnitude) which is easily identifiable to the OTDR, PMA or management system to enable determination if the fibre is broken and/or unplugged. This is especially so where more than reflector is used, to allow for the reflected signals from each of the three reflectors to be discriminated from each other, as well as from actual breaks in the fibre. The reflectors can take the form of a Fibre Bragg Grating (FBG), a thin film filter, or the like as previously described.

Use of one or both of the additional reflectors (26, 27) is not essential to the process of identifying that loss of connection to the RN is due to a powering down, but their deployment allow for an increasingly rich picture to be built up about the status of the connection between the RN and the OLT and other network elements at the head end. This enables a network operator to discover at varying levels of granularity the possible cause of a connection loss, helps to confirm or eliminate yet another potential cause for loss of connection in the T&D process, and can be part of step S12 discussed above in connection with the flow chart of FIG. 3, allowing for ever more informed decisions about any action that needs to be taken.

The skilled person would recognise that a number of variations and alternatives based on the invention are possible to the devices, apparatus, methods, manufacturing methods and materials used. It is possible also to envisage other purposes, aims and environments to which these devices, methods and the like, may be applied. Accordingly, this invention is not limited to the particular set up and applications described herein. In particular, the skilled person would appreciate that the apparatus and methods described herein can be deployed to useful effect in all networks deploying optical fibre in whole or in part, and is not restricted to implementation in FTTdp networks.

An RN can be part of a point to point connection, or point to multi-point system such as a PON. References to a "network" include a single link, where the context permits. The skilled person would appreciate that an RN is "remote" only in that it is located away from another device or location, and so applications and embodiments of the invention can be implemented in any optical network node which is capable of being powered and of receiving an optical signal. Different types of OTDRs can be used and linked to the higher layer application to produce the same result. References herein to the G.Fast model are for ease of description only and the invention is not restricted to applications therein only, as there are numerous situations where a fibre fed remote node may have periodic power issues from reverse power feeding, e.g. a DSLAM using VDSL or ADSL. Other examples of remotely-powered RNs in FTTx networks are street cabinets, in an FTTC network.

What is claimed is:

1. An optical network node capable of being powered, comprising
    a transceiver,
    a retro-reflective reflector arranged to reflect an optical signal back to an optical transmitter that is the source of the optical signal, the optical transmitter being located at a head end of a network to which the optical network node belongs, and
    a switch arranged to direct the optical signal to the transceiver or the reflector in dependence on whether the optical network node is powered,
    wherein the switch is arranged to direct the optical signal to the retro-reflective reflector when the optical network node is unpowered such that the optical signal is reflected back to the optical transmitter that is the source of the optical signal; and
    wherein the optical network node is arranged to transmit a power down indication signal, indicating power loss to the optical network node, to the head end to initiate transmission of a test optical signal from the optical transmitter to the optical network node.

2. An optical network node according to claim 1 wherein the switch comprises a micro-electromechanical systems switch.

3. An optical network node according to claim 2 wherein the retro-reflective reflector comprises at least one of: a Fibre Bragg Grating reflector; a thin film filter; an optical fibre having a cleaved end with a predetermined reflective value; an optical fibre having a cleaved end with a predetermined reflective pattern; and an optical fibre having a cleaved end of a predetermined length having a cleaved end.

4. An optical network node according to claim 1 further comprising a socket for receiving an optical connector plug, the socket including a retro-reflective reflector configured to reflect back to its source an optical signal received via the connector plug.

5. The optical network node according to claim 1 wherein an optical connector, is plugged into the optical network node and comprises a plurality of retro-reflective reflectors.

6. A telecommunications network comprising:
    an optical network node capable of being powered, the optical network node comprising
        a transceiver,
        a retro-reflective reflector arranged to reflect an optical signal back to an optical transmitter that is the source of the optical signal, the optical transmitter being located at a head end of the telecommunications network to which the optical network node belongs, and
        a switch arranged to direct the optical signal to the transceiver or the reflector in dependence on whether the optical network node is powered,
    wherein the optical network node is operationally linked by an optical fibre to the optical transmitter, the switch being arranged to direct an optical signal output by the optical transmitter to the retro-reflective reflector in dependence on whether the optical network node is powered,
    wherein the switch is arranged to direct the optical signal to the retro-reflective reflector when the optical network node is unpowered such that the optical signal is reflected back to the optical transmitter that is the source of the optical signal; and
    wherein the optical network node is arranged to transmit a power down indication signal, indicating power loss to the optical network node, to the head end to initiate transmission of a test optical signal from the optical transmitter to the optical network node.

7. A telecommunications network according to claim 6 wherein the optical transmitter comprises an optical time domain reflectometer.

8. A telecommunications network according to claim 6 including the head end comprising a network management system and an optical line terminal, wherein the network management system comprises a persistent management agent arranged in use to receive messages concerning a loss of connection between the optical network node and the optical line terminal.

9. A telecommunications network according to claim 8 wherein the optical transmitter is co-located with the optical line terminal.

10. A telecommunications network according to claim 6 wherein an optical link comprises an optical connector for plugging into the optical network node, wherein the optical connector comprises at least one retro-reflective reflector.

11. The telecommunications network according to claim 6 further comprising an optical link including an optical connector for plugging into the optical network node, wherein the optical connector comprises a plurality of retro-reflective reflectors.

12. A method of remotely detecting a power status of an optical network node, comprising:
in a first operational state in which the optical network node is powered, using a transceiver to send or receive an optical signal at the optical network node;
in a second operational state, in which the optical network node is not powered, using a switch to direct an optical signal to a retro-reflective reflector arranged to reflect the optical signal back to an optical transmitter that is the source of the optical signal, the optical transmitter being located at a head end of a network to which the optical network node belongs; and
transmitting a power down indication signal, indicating power loss to the optical network node, from the optical network node to the head end to initiate transmission of a test optical signal from the optical transmitter to the optical network node.

13. A method according to claim 12 wherein the optical signal received at the optical network node is received at a wavelength different from a wavelength of optical data communications transmitted between the optical network node and an optical line terminal.

14. A method according to claim 13 wherein the optical signal received at the optical network node is received continuously when the optical network node is powered.

15. A method according to claim 12 wherein the optical signal received at the optical network node is output by an optical time domain reflectometer over an optical fibre operationally connected to the optical network node, and wherein a retro-reflected optical signal received at the optical time domain reflectometer is compared against a reference value based on a length of an optical link.

16. A method according to claim 15 further comprising using the optical time domain reflectometer to establish the reference value at set up.

* * * * *